(12) United States Patent
Saito

(10) Patent No.: US 7,855,793 B2
(45) Date of Patent: Dec. 21, 2010

(54) PRINTING APPARATUS

(75) Inventor: Tomoyuki Saito, Tokyo (JP)

(73) Assignee: Oki Data Corporation, Tokyo (JP)

( * ) Notice: Subject to any disclaimer, the term of this patent is extended or adjusted under 35 U.S.C. 154(b) by 987 days.

(21) Appl. No.: 11/703,776

(22) Filed: Feb. 8, 2007

(65) Prior Publication Data

US 2007/0211278 A1   Sep. 13, 2007

(30) Foreign Application Priority Data

Mar. 10, 2006   (JP) .............................. 2006-065332

(51) Int. Cl.
*G06F 15/00*  (2006.01)
*G06F 3/12*   (2006.01)
*G06K 1/00*   (2006.01)
*G06K 15/00*  (2006.01)

(52) U.S. Cl. ..................................... 358/1.13; 358/1.14

(58) Field of Classification Search .................. 358/1.1, 358/1.13, 1.14, 1.15, 1.18
See application file for complete search history.

(56) References Cited

U.S. PATENT DOCUMENTS 6,873,438 B2 * 3/2005 Fotland ..................... 358/1.9
7,054,490 B2 * 5/2006 Sakaue et al. ............... 382/205

FOREIGN PATENT DOCUMENTS

JP   08-072325   3/1996

* cited by examiner

*Primary Examiner*—Douglas Q Tran
(74) *Attorney, Agent, or Firm*—Kubotera & Associates LLC

(57) ABSTRACT

An information processing apparatus includes a receiving unit for receiving a control command including first identification information; an identification information obtaining unit for obtaining the first identification information from the control command thus received; a storage unit for storing second identification information related to a specific user; an identification information comparing unit for comparing the first identification information with the second identification information; and a control command processing unit for performing a first process when the first identification information matches to the second identification information and performing a second process when the first identification information does not match to the second identification information.

10 Claims, 11 Drawing Sheets

| ESC DLE A   p1 p2 p3 |
|---|
| 1B   10   41 p1 p2 p3 (Hex) |

| Parameter | Description | Value |
|---|---|---|
| p1 | Duplicate printing mode | 0 : Inactive<br>1 : Active |
| p2 | Copy set number | 0 ~ 255 |
| p3 | Print per copy set | 0 : Inactive<br>1 : Active |

| No. | Description | Value |
|---|---|---|
| 1 | Duplicate printing mode | 0 : Inactive<br>1 : Active |
| 2 | Copy set number | 0 ~ 255 |
| 3 | Print per copy set | 0 : Inactive<br>1 : Active |

FIG. 5

(PCL)

| ESC & b # M |
|---|
| 1B 26 62 # 4D (Hex) |

Color specifying command (default)

| Parameter | Description | Value |
|---|---|---|
| # | Color/monochrome specifying command | 0 :<br>1 : |

Monochrome specifying command

FIG. 6

| ESC DLE B   p1 p2 p3 |
| 1B  10  41 p1 p2 p3 (Hex) |

| Parameter | Description | Value |

| No. | Description | Value |
|---|---|---|
| 1 | Duplicate printing mode | 0 : Inactive<br>1 : Active |
| 2 | Text only printing | 0 : Inactive<br>1 : Active |
| 3 | Copy set number | 0 ~ 255 |
| 4 | Print per copy set | 0 : Inactive<br>1 : Active |

FIG. 12

(PCL)

| ESC * b # W |
|---|
| 1B 1A 62 # 57 (Hex) |

| Parameter | Description | Value |
|---|---|---|
| # | Specified transferred data byte number | Transferred data byte number |

FIG. 13

PRINTING APPARATUS

BACKGROUND OF THE INVENTION

The present invention relates to a printing apparatus for printing print data on an original and a duplicate copy according to a duplicate command sent from a host device.

A conventional printing apparatus such as a ticket printer prints on a medium such as a ticket. When such a printing apparatus performs duplicate printing according to a copy command sent from a host device, the printing apparatus prints on a plurality of sheets with same print quality (refer to Patent Reference).

Patent Reference: Japanese Patent Publication No. 08-72325

When the conventional printing apparatus prints on a plurality of sheets with same print quality, an excess amount of toner is consumed. In the duplicate printing, the first sheet is sent to a client or a customer, and subsequent sheets are for distribution and record. Accordingly, the subsequent sheets do not need to be printed with high quality. However, in the conventional printing apparatus, a plurality of sheets having same print quality is printed, thereby consuming an excess amount of toner.

In view of the problems described above, an object of the invention is to provide a printing apparatus, in which it is possible to solve the problems in the conventional printing apparatus. More specifically, when a duplicate command is received from a host device, the printing apparatus prints on an original with quality according to the duplicate command sent from the host device and prints on a duplicate copy with lower quality, thereby conserving toner.

Further objects of the invention will be apparent from the following description of the invention.

SUMMARY OF THE INVENTION

In order to attain the objects, according to the present invention, a printing apparatus receives print data from a host device, and performs a printing operation according to the print data. The printing apparatus may be capable of printing in a plurality of colors. The printing apparatus includes a duplicate printing unit for printing on an original and a duplicate copy according to the print data through a duplicate command from the host device; and a duplicate command detection unit for detecting the duplicate command of the print data. When the duplicate command is detected, the duplicate printing unit prints on the original according to the duplicate command sent from the host device, and prints on the duplicate copy in monochrome.

In the printing apparatus according to the present invention, when the duplicate command is detected, the duplicate printing unit prints on the original according to the duplicate command from the host device, and prints on the duplicate copy with lower quality. Accordingly, it is possible to reduce a consumed amount of developer.

BRIEF DESCRIPTION OF THE DRAWINGS

FIG. 5 is a schematic view showing an example of duplicate command information according to the first embodiment of the present invention;

FIG. 6 is a schematic view showing an example of a color/monochrome specifying command according to the first embodiment of the present invention;

FIG. 12 is a schematic view showing an example of duplicate command information according to the second embodiment of the present invention;

FIG. 13 is a schematic view showing an example of color/monochrome specifying command according to the second embodiment of the present invention;

DETAILED DESCRIPTION OF THE PREFERRED EMBODIMENTS

Hereunder, embodiments of the present invention will be described in more detail with reference to the accompanying drawings.

First Embodiment

Figure 1:
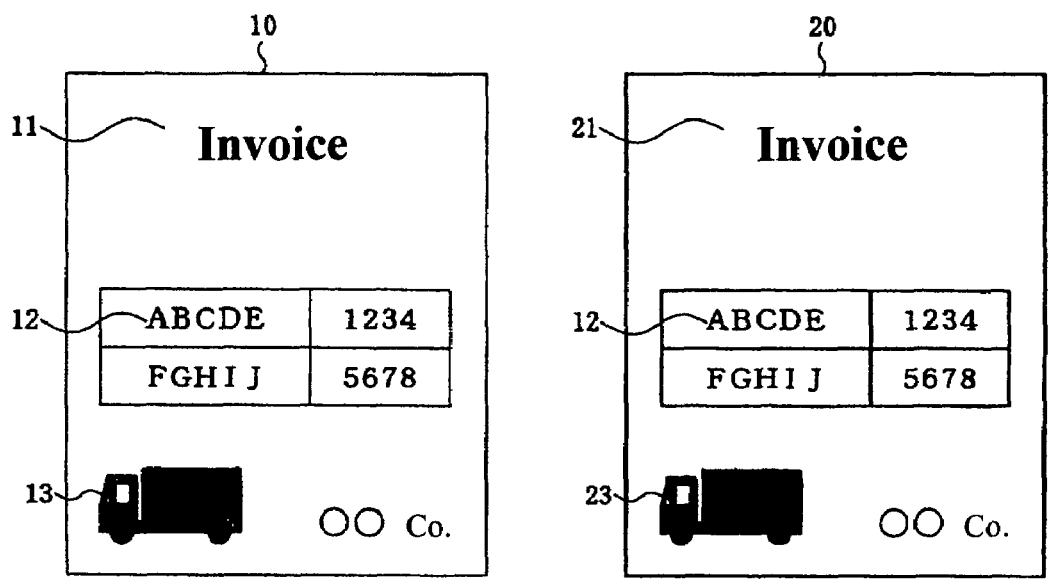
FIG. 1 is a schematic view showing a print result of an original and a duplicate copy according to a first embodiment of the present invention.
Figure 2:
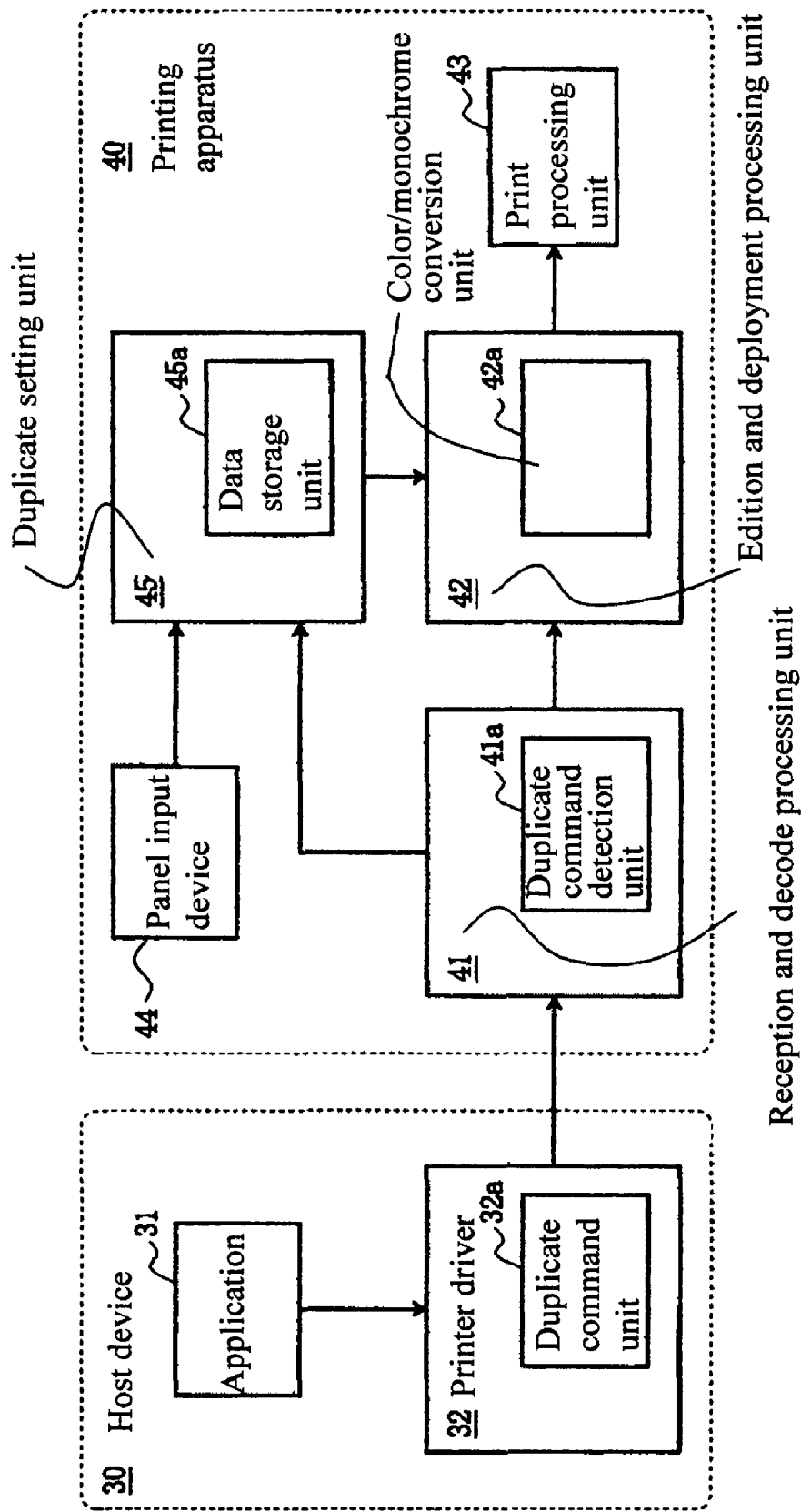
FIG. 2 is a schematic view showing a configuration of a system according to the first embodiment of the present invention.

A first embodiment of the present invention will be explained next. FIG. 1 is a schematic view showing a print result of an original and a duplicate copy according to the first embodiment of the present invention. FIG. 2 is a schematic view showing a configuration of a system according to the first embodiment of the present invention.

As shown in FIG. 2, a printing apparatus 40 is connected to a host device 30 as an upper device thereof through a communication line such as an interface cable and the likes. According to the embodiment of the present invention, the printing apparatus 40 includes any devices capable of forming an image on a medium through an electric-photography process. For example, the printing apparatus 40 may include a facsimile and a copier.

The printing apparatus 40 may be a monochrome printer for forming a monochrome image, i.e., an image in one color. In the embodiment, the printing apparatus 40 is a color printer capable of forming a color image, i.e., an image in multiple colors. Also, it is supposed that the printing apparatus 40 is a device for printing on media such as invoices, tickets, and the likes.

In the printing apparatus 40, developer images formed of developer in colors are formed on developer image supporting members in four image forming units corresponding to four colors, i.e., yellow, magenta, cyan, and black. The developer images are transferred to a medium, thereby forming a color image on the medium.

In the embodiment, the host device 30 is a computer such as a personal computer, a server, and the likes having an operation device such as a CPU, an MPU, and the likes; a storage device such as a hard disk, a semiconductor memory, and the likes; an input device such as a keyboard, a mouse, a touch panel, and the likes; and a display device such as a CRT, a liquid crystal display, and the likes. Further, the host device 30 may include a device capable of generating print data that enables the printing apparatus 40 to perform a printing operation.

In general, even when a plurality of copies is printed, a purpose or value of each copy may vary. For example, in many cases, only one copy is stored for record as an original, and other copies may be printed in monochrome without any problem. In the embodiment of the present invention, an original is printed in colors with high quality sufficient for record purpose, and other duplicate copies (rest of print outs) are printed in monochrome, thereby conserving toner.

As shown in FIG. 1, an original print medium 10 is a medium printed in colors as an original, and a duplicate copy medium 20 is a medium printed in monochrome as a duplicate copy. The print data received from the host device 30 includes, for example, a color text 11, a monochrome text 12, and a color image 13. On the original print medium 10, the color text 11 is printed in colors; the monochrome text 12 is printed in monochrome; and the color image 13 is printed in colors. In contrast, on the duplicate copy medium 20, the color text 11 is printed in monochrome as a monochrome text 21; the monochrome text 12 is printed in monochrome as is; and the color image 13 is printed in monochrome as a monochrome image 23.

The host device 30 includes an application 31 for creating the print data and the likes, and a printer driver 32 for directing the printing apparatus 40 to perform a printing operation. The printer driver 32 includes a duplicate command unit 32a for conducting print setting of the original print medium 10 and the duplicate copy medium 20.

In the embodiment, the printing apparatus 40 includes a reception and decode processing unit 41; an edition and deployment processing unit 42; a print processing unit 43; a panel input device 44; and a duplicate setting unit 45. The reception and decode processing unit 41 receives the print data sent from the host device 30 and decoded the print data thus received. The reception and decode processing unit 41 includes a duplicate command detection unit 41a as a duplicate direction detecting unit for detecting a duplicate direction of the print data or a duplicate command sent from the host device 30.

In the embodiment, the duplicate setting unit 45 sets and stores duplicate command information according to the duplicate command detected by the duplicate command detection unit 41a, and directs the edition and deployment processing unit 42 to conduct duplicate printing. Further, the duplicate setting unit 45 includes a data storage unit 45a for storing the print data to be used one more time for the duplicate printing.

In the embodiment, the panel input device 44 processes a mode input through an operation panel (not shown) provided in the printing apparatus 40. An operator may operate the operation panel to directly input the duplicate command information.

In the embodiment, the edition and deployment processing unit 42 converts the print data decoded by the reception and decode processing unit 41 to a bitmap image that can be printed. Further, the edition and deployment processing unit 42 includes a color/monochrome conversion unit 42a, so that the color/monochrome conversion unit 42a converts a color command to a monochrome command when the duplicate command is received from the duplicate setting unit 45.

In the embodiment, the print processing unit 43 prints the print data converted to the bitmap image on a medium. Note that the edition and deployment processing unit 42, the print processing unit 43, and the duplicate setting unit 45 constitute a duplicate printing unit for printing on the original and the duplicate copy according to the print data through the duplicate command sent from the host device 30.

Figures 3, 4:
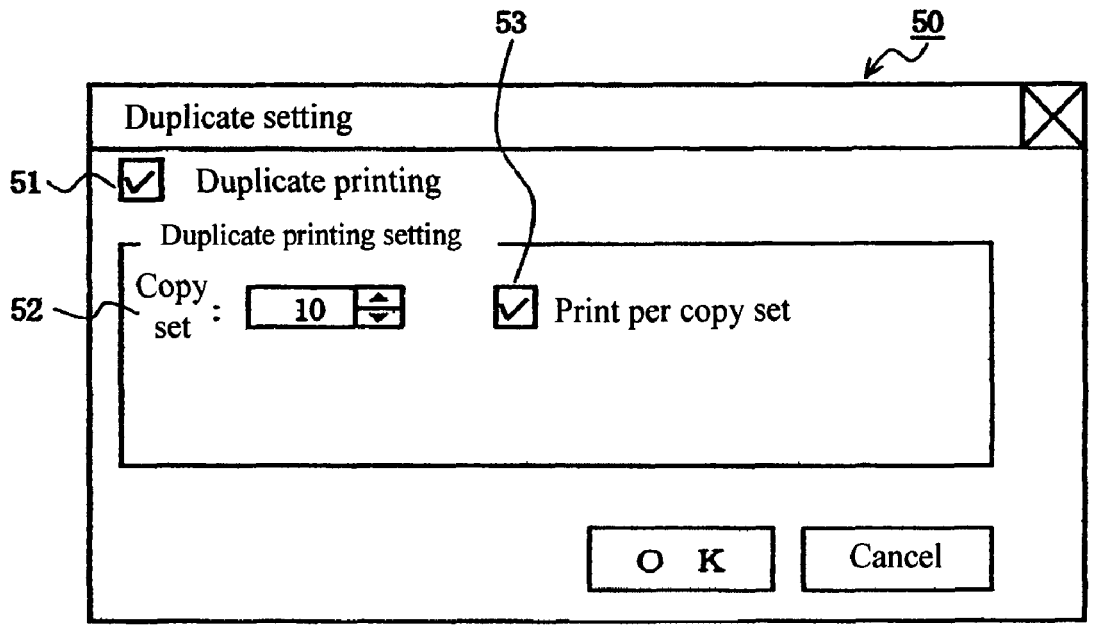
FIG. 3 is a schematic view showing an example of a duplicate command display of printer driver according to the first embodiment of the present invention.
FIG. 4 is a schematic view showing an example of a duplicate command according to the first embodiment of the present invention.

An operation of the printing apparatus 40 will be explained next. An operation of setting the duplicate command will be explained first. FIG. 3 is a schematic view showing an example of a duplicate command display 51 of the printer driver 30 according to the first embodiment of the present invention. FIG. 4 is a schematic view showing an example of the duplicate command according to the first embodiment of the present invention.

In the embodiment, the duplicate command specifying the number of copy sets is set through the panel input device 44 or the host device 30. Then, the first sheet is printed in colors normally as the original, and the subsequent sheets are printed in monochrome as the duplicate copies. In the following description, the duplicate command is assumed to be set through the host device 30.

As shown in FIG. 3, the duplicate command display 50 of the host device 30 has a duplicate print box 51, and the duplicate print box 51 is checked to set the duplicate command through the host device 30. It is possible to specify the number of copy sets 52 and whether the printing is conducted per copy set 53.

When the duplicate command is set as described above, the duplicate command shown in FIG. 4 is sent from the host device 30 to the printing apparatus 40.

Figure 7:
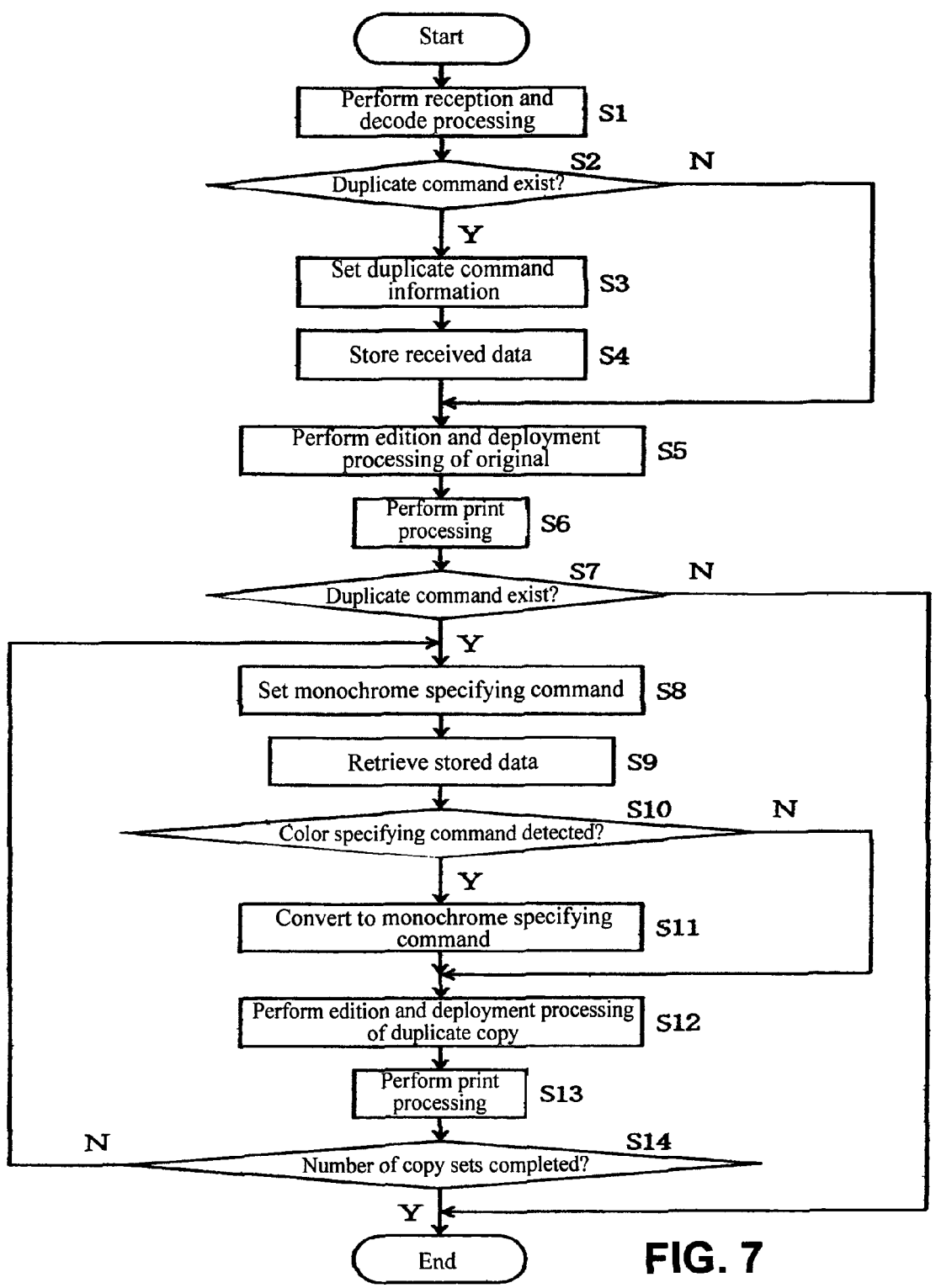
FIG. 7 is a flow chart of an operation of duplicate printing of a printing apparatus according to the first embodiment of the present invention.

An operation of the duplicate printing of the printing apparatus 40 will be explained next. FIG. 5 is a schematic view showing an example of the duplicate command information according to the first embodiment of the present invention. FIG. 6 is a schematic view showing an example of a color/monochrome specifying command according to the first embodiment of the present invention. FIG. 7 is a flow chart of the operation of the duplicate printing of the printing apparatus 40 according to the first embodiment of the present invention.

When the reception and decode processing unit 41 of the printing apparatus 40 receives the print data from the host device 30, the reception and decode processing unit 41 decodes the print data, i.e., performs reception and decode processing. The duplicate command detection unit 41a determines whether the duplicate command exists in the print data sent from the host device 30. As shown in FIG. 4, the duplicate command includes information such as a duplicate mode, the number of copy sets, and the mode of printing per copy set.

When the duplicate command exists in the print data, as shown in FIG. 5, the duplicate setting unit 45 sets the duplicate command information including the duplicate mode, the number of copy sets, and the mode of printing per copy set according to the duplicate command.

In the duplicate command information, when the duplicate command does not exist, the duplicate mode is designated as 0. When the duplicate command exists, the duplicate mode is designated as 1. The number of copy sets indicates the number of copy sets to be printed. When the mode of printing per copy set is activated, the mode of printing per copy set is designated as 1. When the mode of printing per copy set is not activated, the mode of printing per copy set is designated as 0.

In the duplicate printing, it is necessary to read the print data one more time. Accordingly, it is arranged such that the print data or received data is stored in the data storage unit 45a.

In the next step, the edition and deployment processing unit 42 retrieves the print data stored in the data storage unit 45a, and performs edition and deployment processing for converting the print data to the printable bitmap image. Then, the print processing unit 43 performs print processing for printing the print data converted to the bitmap image on a medium.

The duplicate command detection unit 41a determines whether there is the duplicate command through the duplicate mode in the duplicate command information. When the duplicate mode is activated, the duplicate setting unit 45 sets a monochrome specifying command (ESC & b 1 M) in the color/monochrome specifying command shown in FIG. 6, so that the monochrome specifying command is added to the received data. Accordingly, the edition and deployment processing unit 42 is directed to perform the monochrome printing on subsequent sheets.

In the next step, the edition and deployment processing unit 42 retrieves the stored data for printing the duplicate copy, and reads the received data from the data storage unit 45a one more time. While the edition and deployment processing unit 42 reads the received data, the color/monochrome conversion unit 42a determines whether the color specifying command (ESC & b 0 M) is detected. When the color specifying command (ESC & b 0 M) is detected, the color/monochrome conversion unit 42a converts the color specifying command (ESC & b 0 M) to the monochrome specifying command (ESC & b 1 M).

In the next step, the edition and deployment processing unit 42 performs the edition and deployment processing for converting the received data to the printable bitmap image, thereby creating the bitmap image for the monochrome printing.

In creating the bitmap image, for example, when color data is input in a CMY format, values of C, M, and Y corresponding to each pixel multiplied by coefficients are added to create monochrome data corresponding to the pixel. For example, the monochrome data may be a sum of the value of C multiplied by 0.3, the value of M multiplied by 0.6, and the value of Y multiplied by 0.1.

The conversion described above is repeated for all pixels, so that the monochrome data is created from the color data. Then, the print processing unit 43 performs the print processing on the medium according to the print data converted to the bitmap image, thereby performing the monochrome printing.

In the next step, it is determined whether the number of copy sets is completed. When the number of copy sets is completed, the printed media are discharged, thereby competing the process. When the number of copy sets is not completed, the process described above is repeated. That is, when the number of copy sets in the duplicate command information is more than one, the process is repeated for the specified number. When the duplicate mode in the duplicate command information is not activated, i.e., the duplicate printing is not specified, only the original is printed, and the print data is deleted after the printed medium is discharged.

As described above, in the embodiment, the color printing is converted to the monochrome printing, thereby conserving developer. In the monochrome printing, a print processing time is reduced. Further, a toner layer on a medium is singular.

Accordingly, it is assumed that a fixing time of the monochrome printing is same as that of the color printing, it is possible to stably fix an image at a higher transporting speed. As a result, it is possible to reduce a print processing time by increasing a transporting speed, thereby improving productivity.

In the embodiment, it is possible to perform the monochrome printing using developer having a largest remaining amount among multiple colors. In the case of yellow, since yellow is not distinguishable, it is preferred to perform printing with shadow, printing with frame, two-color printing, and the likes. In general, the monochrome printing is performed at a furthermost location on a downstream side of the image forming unit in a transportation direction, thereby eliminating smear in the image forming unit due to developer.

In the embodiment, when a plurality of copy sets is specified through the host device 30, the first set is printed in colors normally as an original, and the subsequent sets are printed in monochrome as duplicate copies. For example, when the print data includes data of five pages, the first set having five pages is printed in colors. The subsequent sets having five pages are printed in monochrome. Further, it is possible to print the first page of the first set in colors and the first pages of the subsequent sets in monochrome. Then, the second page of the first set is printed in colors, and the second pages of the subsequent sets are printed in monochrome. The following pages are printed in the same way.

The flow chart shown in FIG. 7 will be explained next. In step S1, the reception and decode processing is performed. In step S2, it is determined whether the duplicate command exists. When the duplicate command exists, the process proceeds to step S3. When the duplicate command does not exist, the process proceeds to step S5.

In step S3, the duplicate command information is set. In step S4, the received data is stored. In step S5, the edition and deployment processing of the original is performed. In step S6, the print processing is performed. In step S7, it is determined whether the duplicate command exists. When the duplicate command exists, the process proceeds to step S8. When the duplicate command does not exist, the process is completed.

In step S8, the monochrome specifying command is set. In step S9, the stored data is retrieved. In step S10, it is determined whether the color specifying command is detected. When the color specifying command is detected, the process proceeds to step S11. When the color specifying command is not detected, the process proceeds to step S12.

In step S11, the color specifying command is converted to the monochrome specifying command. In step S12, the edition and deployment processing of the duplicate copy is performed. In step S13, the print processing is performed. In step S14, it is determined whether the number of copy sets is completed. When the number of copy sets is completed, the process is completed. When the number of copy sets is not completed, the process returns to step S8.

As described above, in the first embodiment of the present invention, when the number of copy sets is set plural, the original is printed in colors according to the normal print command. The duplicate copy (subsequent set) is printed in monochrome, thereby conserving developer.

Second Embodiment

A second embodiment of the present invention will be explained next. Components in the second embodiment similar to those in the first embodiment are designated with the same reference numerals, and explanations thereof are omitted. The components and operations similar to those in the first embodiment provide the similar effects, and explanations thereof are omitted.

Figure 8:
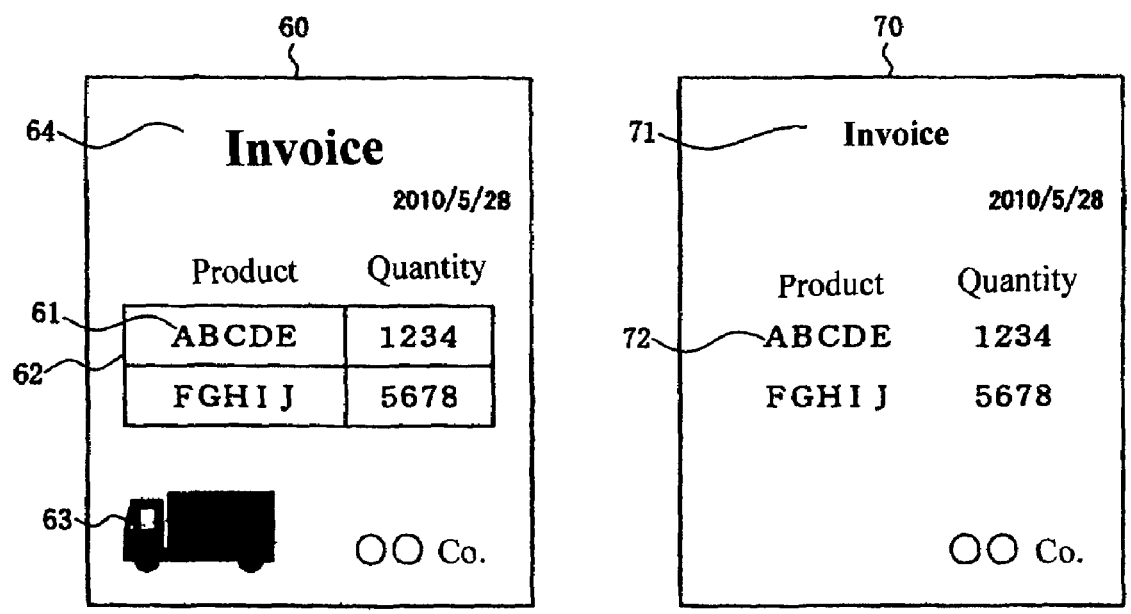
FIG. 8 is a schematic view showing a print result of an original and a duplicate copy according to a second embodiment of the present invention.
Figure 9:
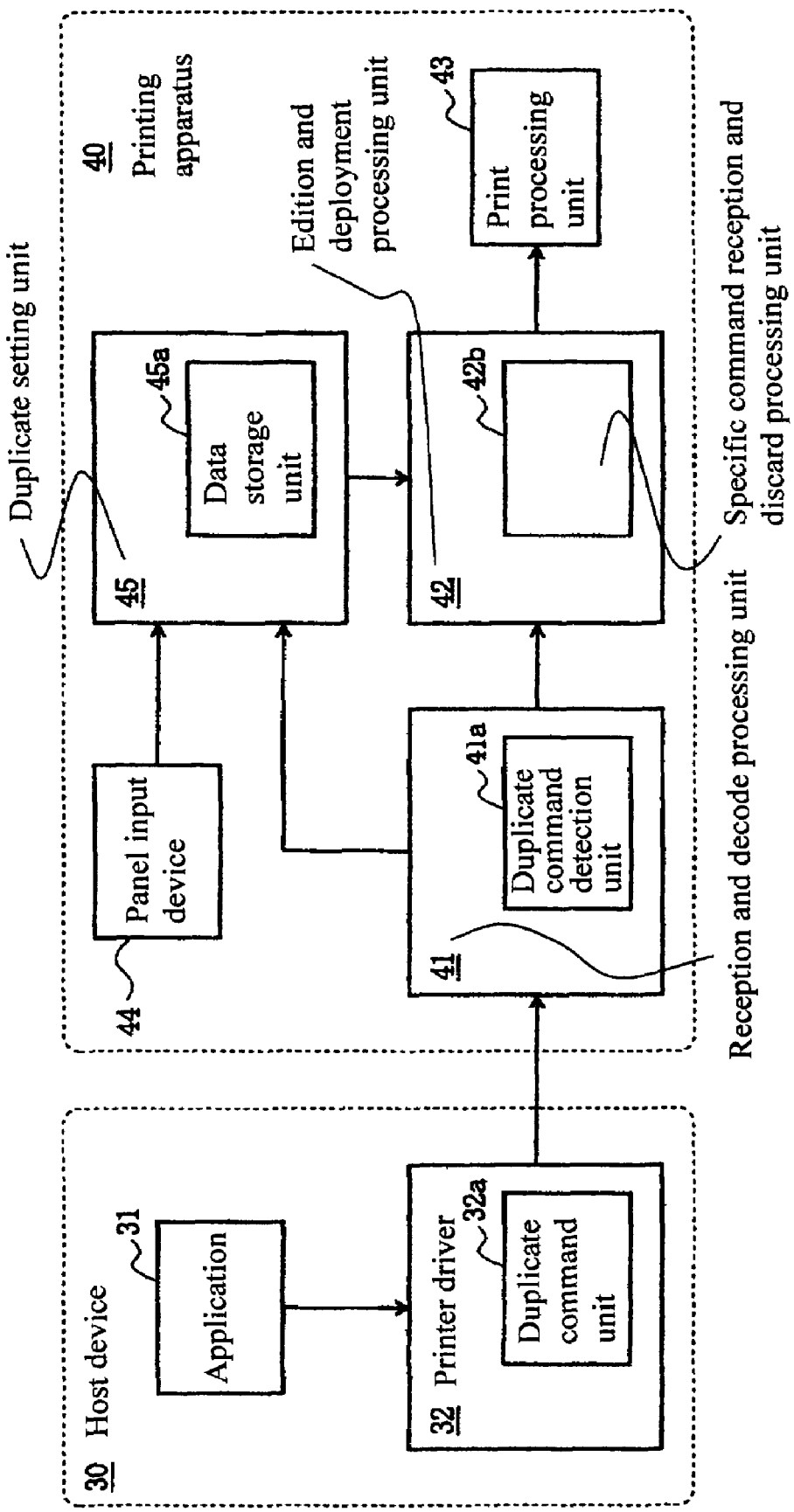
FIG. 9 is a schematic view showing a configuration of a system according to the second embodiment of the present invention.

FIG. 8 is a schematic view showing a print result of an original and a duplicate copy according to the second embodiment of the present invention. FIG. 9 is a schematic view showing a configuration of a system according to the second embodiment of the present invention.

In the second embodiment, after the original is printed normally, only necessary texts are printed on the duplicate copy.

As shown in FIG. 8, an original print medium 60 is a medium printed normally as an original, and a duplicate copy medium 70 is a medium printed as a duplicate copy. The print data received from the host device 30 includes, for example, a standard text 61, a frame form 62, an image 63, and a modification text 64. On the original print medium 60, the standard text 61, the frame form 62, the image 63, and the modification text 64 are printed. In contrast, on the duplicate copy medium 70, standard texts 71 and 72 are printed.

In the embodiment, the duplicate command unit 32a of the printer driver 32 conducts print setting of the original print medium 60 and the duplicate copy medium 70. Further, the duplicate setting unit 45 performs a process different from that in the first embodiment. The edition and deployment processing unit 42 includes a specific command reception and discard processing unit 42b for performing a reception and discard process of a specific command. Other components in the second embodiment are the same as those in the first embodiment, and explanations thereof are omitted.

Figures 10, 11:
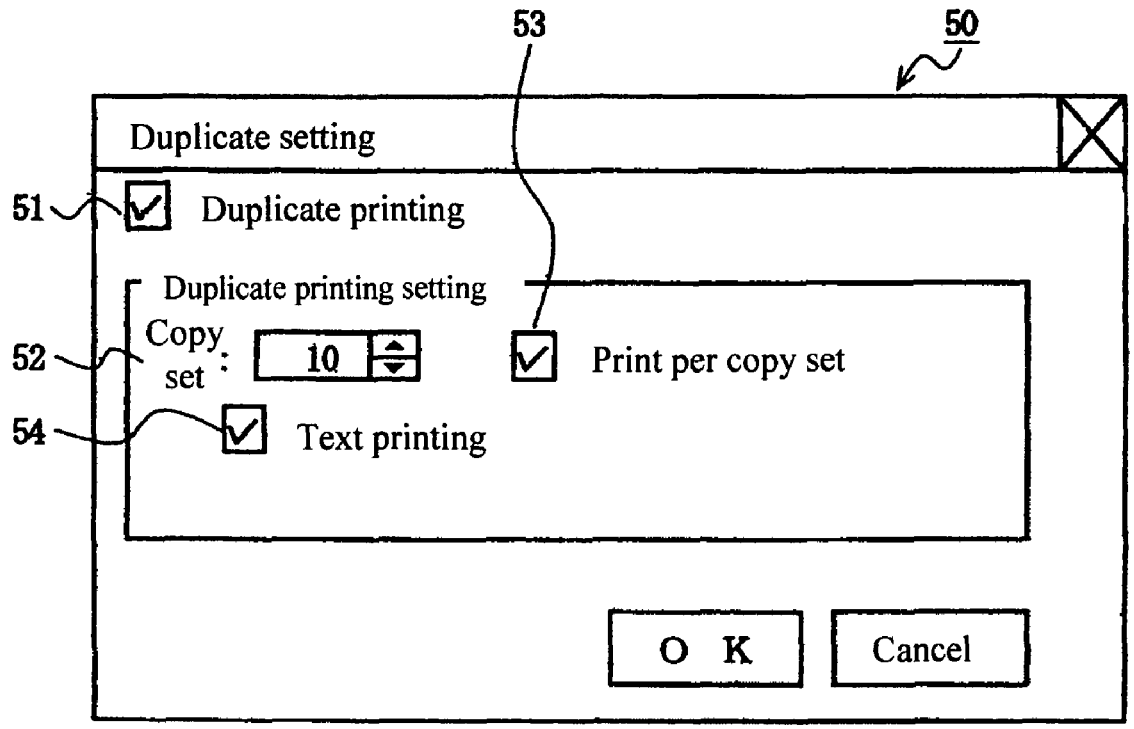
FIG. 10 is a schematic view showing an example of a duplicate command display of printer driver according to the second embodiment of the present invention.
FIG. 11 is a schematic view showing an example of a duplicate command according to the second embodiment of the present invention.

An operation of the printing apparatus 40 will be explained next. An operation of setting the duplicate command will be explained first. FIG. 10 is a schematic view showing an example of the duplicate command display 50 of the printer driver according to the second embodiment of the present invention. FIG. 11 is a schematic view showing an example of the duplicate command according to the second embodiment of the present invention.

As shown in FIG. 10, the duplicate command display 50 of the host device 30 has the duplicate print box 51, and the duplicate print box 51 is checked to set the duplicate command through the host device 30. It is possible to set the number of copy sets 52 and whether the printing is conducted per copy set 53. When the printing operation is conducted only for texts without the image 63, a text printing 54 is checked to set the mode.

When the duplicate command is set as described above, the duplicate command shown in FIG. 11 is sent from the host device 30 to the printing apparatus 40.

Figure 14:
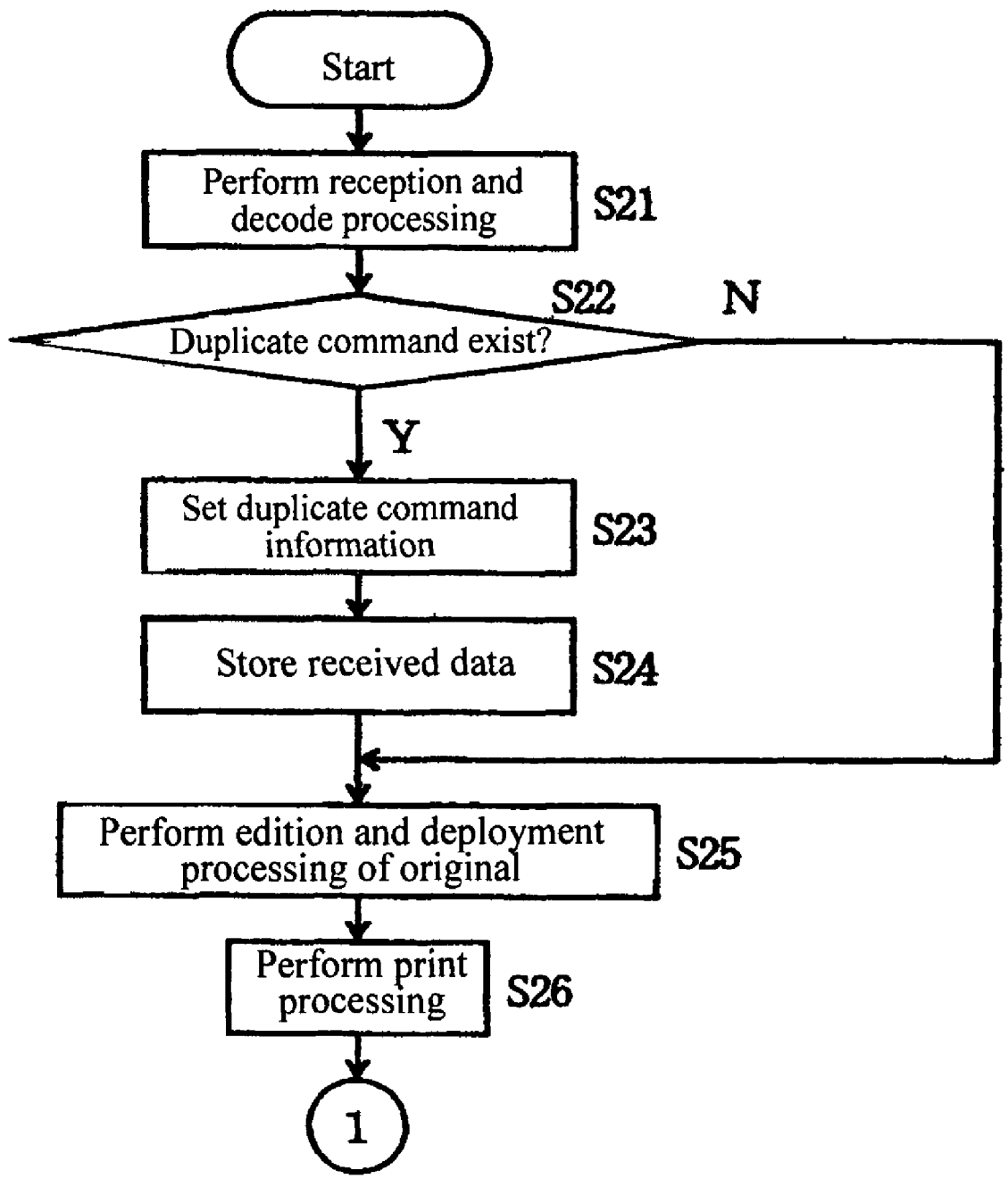
FIG. 14 is a flow chart No. 1 of an operation of duplicate printing of a printing apparatus according to the second embodiment of the present invention.
Figure 15:
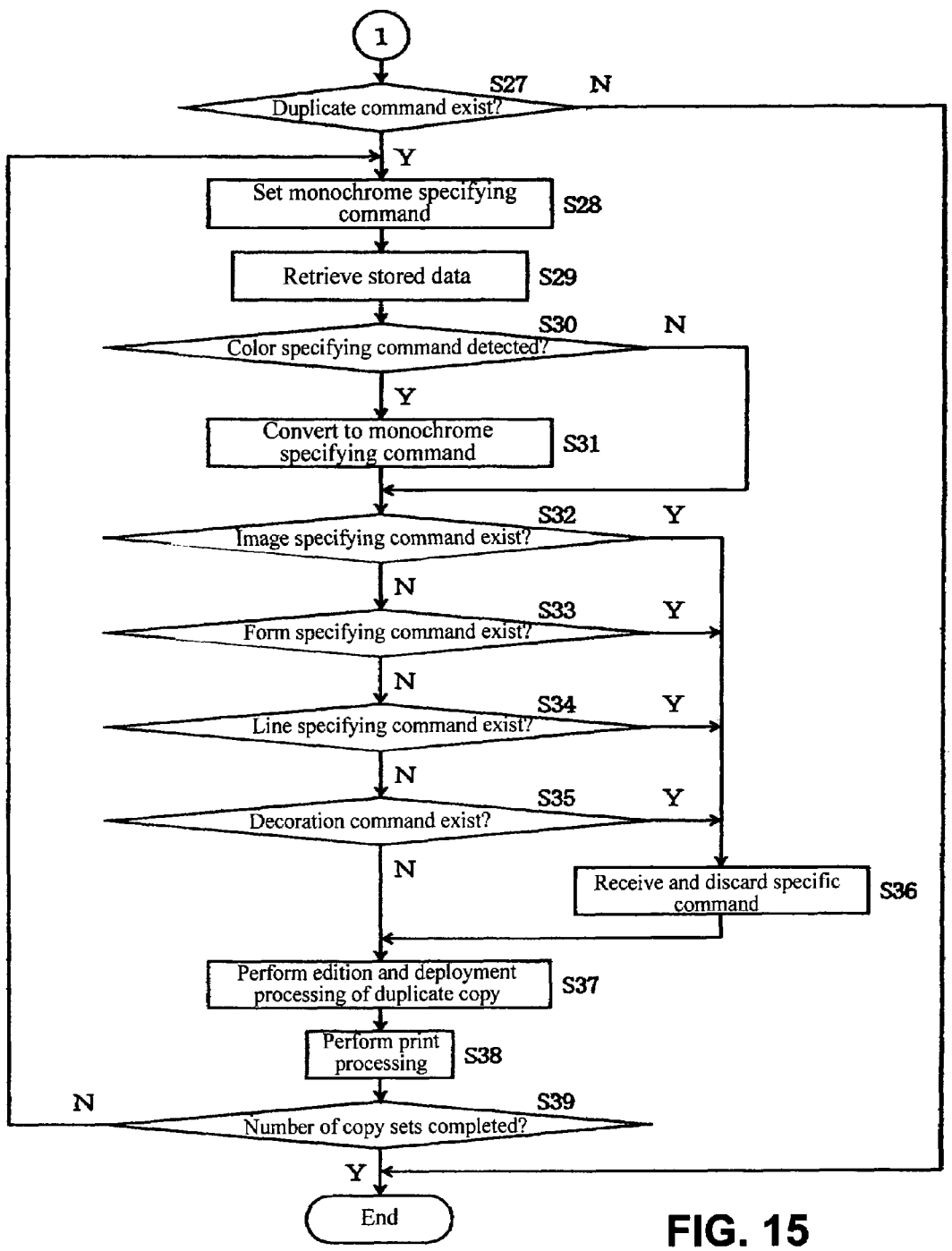
FIG. 15 is a flow chart No. 2 of the operation of the duplicate printing of the printing apparatus according to the second embodiment of the present invention.

An operation of the duplicate printing of the printing apparatus 40 will be explained next. FIG. 12 is a schematic view showing an example of the duplicate command information according to the second embodiment of the present invention. FIG. 13 is a schematic view showing an example of the color/monochrome specifying command according to the second embodiment of the present invention. FIG. 14 is a flow chart No. 1 of an operation of the duplicate printing of the printing apparatus according to the second embodiment of the present invention. FIG. 15 is a flow chart No. 2 of the operation of the duplicate printing of the printing apparatus according to the second embodiment of the present invention.

When the reception and decode processing unit 41 of the printing apparatus 40 receives the print data from the host device 30, the reception and decode processing unit 41 decodes the print data, i.e., performs the reception and decode processing. The duplicate command detection unit 41a determines whether the duplicate command exists in the print data sent from the host device 30. As shown in FIG. 11, the duplicate command includes information such as the duplicate mode, the number of copy sets, and the mode of printing per copy set.

When the duplicate command exists in the print data, as shown in FIG. 12, the duplicate setting unit 45 sets the duplicate command information including the duplicate mode, a text only printing mode, the number of copy sets, and the mode of printing per copy set according to the duplicate command.

In the duplicate command information, when the duplicate command does not exist, the duplicate mode is designated as 0. When the duplicate command exists, the duplicate mode is designated as 1. When the text only printing mode is not activated, the text only printing is designated as 0. When the text only printing mode is activated, the text only printing is designated as 1. The number of copy sets indicates the number of copy sets to be printed. When the mode of printing per copy set is activated, the mode of printing per copy set is designated as 1. When the mode of printing per copy set is not activated, the mode of printing per copy set is designated as 0.

In the duplicate printing, it is necessary to read the print data one more time. Accordingly, it is arranged such that the print data or received data is stored in the data storage unit 45a.

In the next step, the edition and deployment processing unit 42 retrieves the print data stored in the data storage unit 45a for printing on the original, and performs the edition and deployment processing for converting the print data to the printable bitmap image. Then, the print processing unit 43 performs the print processing for printing the print data converted to the bitmap image on a medium.

The duplicate command detection unit 41a determines whether there is the duplicate command through the duplicate mode in the duplicate command information. When the duplicate mode is activated, i.e., the duplicate command exists, the duplicate setting unit 45 sets the monochrome specifying command (ESC & b 1 M) in the color/monochrome specifying command shown in FIG. 13, so that the monochrome specifying command is added to the received data. Accordingly, the edition and deployment processing unit 42 is directed to perform the monochrome printing on subsequent sheets.

In the next step, the edition and deployment processing unit 42 retrieves the stored data for printing the duplicate copy, and reads the received data from the data storage unit 45a one more time. While the edition and deployment processing unit 42 reads the received data, the color/monochrome conversion unit 42a determines whether the color specifying command (ESC & b 0 M) is detected. When the color specifying command (ESC & b 0 M) is detected, the color/monochrome conversion unit 42a converts the color specifying command (ESC & b 0 M) to the monochrome specifying command (ESC & b 1 M).

When the only text printing mode is activated, a specific command used for advertisement, decoration, appearance, and the likes is received and discarded. The specific command includes an image specifying command for specifying the image 63 such as an image data; a form specifying command for specifying a form such as a frame and the likes; a line specifying command for specifying a line such as an under line, an over line, and the likes; and a decoration command for performing text decoration such as bold, italic, enlargement and the likes.

The specific command reception and discard processing unit 42b determines whether the specific command exists. When the specific command exists, the specific command reception and discard processing unit 42b receives and discards the specific command. When an image transfer command (ESC * b # W) is received during reading the received data, the image data is canceled through the reception and discard processing.

In the next step, the edition and deployment processing unit 42 performs the edition and deployment processing for converting the received data to the printable bitmap image. In this case, since the reception and discard processing of the specific command is performed, the bitmap image is created for printing only the text in monochrome. Then, the print processing unit 43 performs the print processing on a medium according to the print data converted to the bitmap image, thereby printing only the text in monochrome.

In the next step, it is determined whether the number of copy sets is completed. When the number of copy sets is completed, the printed media are discharged, thereby competing the process. When the number of copy sets is not completed, the process described above is repeated. That is, when the number of copy sets in the duplicate command information is more than one, the process is repeated for the specified number. When the duplicate mode in the duplicate command information is not activated, i.e., the duplicate printing does not exist, only the original is printed, and the received data is deleted after the printed medium is discharged.

As described above, in the embodiment, the color printing is converted to the monochrome printing, and the specific command is received and discarded. Accordingly, the bitmap data is created for printing only the text in monochrome, thereby conserving developer. In printing only the text in monochrome, a print processing time is reduced. Further, a toner layer on a medium is singular. Accordingly, when a fixing time is same as that of the color printing, it is possible to stably fix an image at a higher transporting speed. As a result, it is possible to reduce print processing time by increasing a transporting speed, thereby improving productivity.

The flow charts shown in FIGS. 14 and 15 will be explained next. In step S21, the reception and decode processing is performed. In step S22, it is determined whether the duplicate command exists. When the duplicate command exists, the process proceeds to step S23. When the duplicate command does not exist, the process proceeds to step S25.

In step S23, the duplicate command information is set. In step S24, the received data is stored. In step S25, the edition and deployment processing of the original is performed. In step S26, the print processing is performed. In step S27, it is determined whether the duplicate command exists. When the duplicate command exists, the process proceeds to step S28. When the duplicate command does not exist, the process is completed.

In step S28, the monochrome specifying command is set. In step S29, the stored data is retrieved. In step S30, it is determined whether the color specifying command is detected. When the color specifying command is detected, the process proceeds to step S31. When the color specifying command is not detected, the process proceeds to step S32. In step S31, the color specifying command is converted to the monochrome specifying command.

In step S32, it is determined whether the image specifying command exists. When the image specifying command exists, the process proceeds to step S36. When the image specifying command does not exist, the process proceeds to step S33. In step S33, it is determined whether the form specifying command exists. When the form specifying command exists, the process proceeds to step S36. When the form specifying command does not exist, the process proceeds to step S34.

In step S34, it is determined whether the line specifying command exists. When the line specifying command exists, the process proceeds to step S36. When the line specifying command does not exist, the process proceeds to step S35. In step S35, it is determined whether the decoration command exists. When the decoration command exists, the process proceeds to step S36. When the decoration command does not exist, the process proceeds to step S37.

In step S36, the specific command is received and discarded. In step S37, the edition and deployment processing of the duplicate copy is performed. In step S38, the print processing is performed. In step S39, it is determined whether the number of copy sets is completed. When the number of copy sets is completed, the process is completed. When the number of copy sets is not completed, the process returns to step S28.

As described above, in the second embodiment of the present invention, the number of copy sets is set plural, the original including an image, a form, a frame, and the likes is printed according to the normal print command. The duplicate copy (subsequent set) including only the important information such as a number, price, and the likes is printed in monochrome, thereby conserving developer.

In the embodiment, the printer driver 32 may insert important information determining commands before and after the important information. Then, the printing apparatus 40 may print only the important information sandwiched with the important information determining commands. In determining whether the important information exists, the print data specified with stress is determined as the important information on the application 31, and the important information determining commands are added before and after the print data.

In the first and second embodiments, the printing apparatus 40 is the printer, and the present invention may be applicable to an MFP (Multi Function Printer), a scanner, or a copier.

The disclosure of Japanese Patent Application No. 2006-065332, filed on Mar. 10, 2006, is incorporated in the application.

While the invention has been explained with reference to the specific embodiments of the invention, the explanation is illustrative and the invention is limited only by the appended claims.

What is claimed is:

1. A printing apparatus for printing upon receiving a duplicate command from a host device, comprising:
   a duplicate printing unit for printing on at least one of an original and a duplicate copy; and
   a duplicate command detection unit for detecting the duplicate command so that the duplicate printing unit prints on the original according to print data sent from the host device and prints on the duplicate copy in one color when the duplicate command detection unit detects the duplicate command.

2. The printing apparatus according to claim 1, wherein said duplicate printing unit prints on the duplicate copy in the one color having a remaining amount in a cartridge larger than that of any of other color.

3. The printing apparatus according to claim 1, wherein said duplicate printing unit prints on the duplicate copy in the one color stored in a cartridge at a furthermost location in a direction that a medium is transported.

4. The printing apparatus according to claim 1, wherein said duplicate printing unit prints on the duplicate copy with at least one of shade and a frame when the one color is yellow.

5. The printing apparatus according to claim 1, wherein said duplicate printing unit prints on the duplicate copy in the one color and prints on the duplicate copy in another color when the one color is yellow.

6. The printing apparatus according to claim 1, wherein said duplicate printing unit prints on the original in a plurality of colors.

7. The printing apparatus according to claim 1, wherein said duplicate printing unit prints on the duplicate copy according to part of the print data.

8. The printing apparatus according to claim 1, wherein said duplicate printing unit prints only a text on the duplicate copy according to part of the print data.

9. A printing system for printing on at least one of an original and a duplicate copy, comprising;

a host device for sending a duplicate command and print data;

a duplicate printing unit for printing on the at least one of the original and the duplicate copy upon receiving the print data; and a duplicate command detection unit for detecting the duplicate command so that the duplicate printing unit prints on the original according to the print data and prints on the duplicate copy in one color when the duplicate command detection unit detects the duplicate command.

10. The printing system according to claim 9, wherein said duplicate printing unit prints only a text on the duplicate copy according to part of the print data.

* * * * *